US012791117B2

(12) United States Patent
Cocciardi

(10) Patent No.: US 12,791,117 B2
(45) Date of Patent: Nov. 10, 2026

(54) FLOAT VALVE

(71) Applicant: Magenta Haze Pty Ltd, Cranbourne (AU)

(72) Inventor: Peter Cocciardi, Cranbourne (AU)

(73) Assignee: MAGENTA HAZE PTY LTD, Cranbourne (AU)

( * ) Notice: Subject to any disclaimer, the term of this patent is extended or adjusted under 35 U.S.C. 154(b) by 0 days.

(21) Appl. No.: 17/427,732

(22) PCT Filed: Feb. 17, 2020

(86) PCT No.: PCT/AU2020/000017
§ 371 (c)(1),
(2) Date: Aug. 2, 2021

(87) PCT Pub. No.: WO2020/163898
PCT Pub. Date: Aug. 20, 2020

(65) Prior Publication Data

US 2022/0112964 A1 Apr. 14, 2022

(30) Foreign Application Priority Data

Feb. 15, 2019 (AU) ................................ 2019900495

(51) Int. Cl.
*F16K 31/26* (2006.01)
*F16K 1/52* (2006.01)
(Continued)

(52) U.S. Cl.
CPC ............ *F16K 31/265* (2013.01); *F16K 1/523* (2013.01); *F16K 33/00* (2013.01); *G05D 9/02* (2013.01)

(58) Field of Classification Search
CPC ........ F16K 31/265; F16K 31/26; F16K 31/24; F16K 1/523; F16K 33/00; G05D 9/02;
(Continued)

(56) References Cited

U.S. PATENT DOCUMENTS

| | | | | |
|---|---|---|---|---|
| 906,832 A | | 12/1908 | Soderlund | |
| 1,576,600 A | * | 3/1926 | Haas ...................... | F16K 31/26 137/434 |

(Continued)

FOREIGN PATENT DOCUMENTS

| | | |
|---|---|---|
| CN | 201 100 420 | 8/2008 |
| DE | 200 384 | 4/1907 |

(Continued)

*Primary Examiner* — Craig M Schneider
*Assistant Examiner* — Andrew J Rost
(74) *Attorney, Agent, or Firm* — Millen, White, Zelano & Branigan, P.C.; Christopher W. Brody

(57) ABSTRACT

A valve includes a valve body, valve arm hinge and valve piston. The valve arm hinge connects the valve arm to the valve body through a pivoting connection. The valve piston moves linearly in a valve piston channel. When a pressurized fluid contacts a second valve piston end, a force is applied to a second valve piston end. Movement of the valve arm from a first valve arm position to a second valve arm position allows the valve piston to move, under the force applied from closed, to open and allows fluid to flow through a valve channel. The float in the first valve arm position is above the position of the float when in the second valve arm position. If fluid in the tank goes below a critical tank fluid level, the valve arm moves from the first valve arm position to the second valve arm position.

17 Claims, 11 Drawing Sheets

(51) Int. Cl.
*F16K 33/00* (2006.01)
*G05D 9/02* (2006.01)

(58) Field of Classification Search
CPC ................ A01K 7/04; Y10T 137/7485; Y10T 137/7468
USPC .................... 137/448, 447, 434, 315.08, 443
See application file for complete search history.

(56) References Cited

U.S. PATENT DOCUMENTS

| | | | | | |
|---|---|---|---|---|---|
| 1,677,687 | A | * | 7/1928 | Reed | F16K 31/26 137/446 |
| 1,962,991 | A | | 6/1934 | Laux | |
| 2,439,282 | A | | 4/1948 | Beckett | |
| 2,629,397 | A | * | 2/1953 | Toadvine | A01K 39/022 251/89 |
| 2,693,817 | A | * | 11/1954 | Kmiecik | F16K 31/26 137/443 |
| 2,722,231 | A | * | 11/1955 | Hansen | F16K 31/26 137/446 |
| 2,724,403 | A | | 11/1955 | Salardi | |
| 2,766,770 | A | * | 10/1956 | Dickinson | F16K 31/24 137/448 |
| 2,827,917 | A | * | 3/1958 | Cripe | F16K 31/26 137/445 |
| 3,385,317 | A | * | 5/1968 | Yankers | E03D 1/33 251/234 |
| 4,013,092 | A | | 3/1977 | Reitman | |
| 4,229,846 | A | * | 10/1980 | English, Jr. | E03D 1/142 4/395 |
| 4,631,760 | A | | 12/1986 | Leishman et al. | |
| 4,655,244 | A | * | 4/1987 | Park | F16K 31/265 137/449 |
| 4,796,650 | A | * | 1/1989 | Hwang | F16K 31/26 137/448 |
| 5,141,405 | A | | 8/1992 | Francart | |
| 5,205,319 | A | * | 4/1993 | Chiang | E03D 1/32 137/423 |
| 5,857,483 | A | * | 1/1999 | Stone, III | F16K 31/26 137/446 |
| 6,138,709 | A | * | 10/2000 | Home | F16K 31/34 137/413 |
| 6,142,175 | A | | 11/2000 | Ku | |
| 8,430,119 | B2 | * | 4/2013 | Fackler | A01K 7/04 137/448 |
| 2001/0000873 | A1 | | 5/2001 | Kozik | |

FOREIGN PATENT DOCUMENTS

| | | |
|---|---|---|
| GB | 280340 | 11/1927 |
| GB | 2176873 | 1/1987 |
| JP | 2015-215086 | 12/2015 |
| KR | 2001-0113022 | 12/2001 |

* cited by examiner

FLOAT VALVE

FIELD OF INVENTION

This invention relates to a valve. More particularly, this invention relates to a float valve for controlling water levels in a water storage unit.

BACKGROUND ART

The following references to and descriptions of prior proposals or products are not intended to be, and are not to be construed as, statements or admissions of common general knowledge in the art. In particular, the following prior art discussion should not be assumed to relate to what is commonly or well known by the person skilled in the art, but to assist in the inventive process undertaken by the inventor and in the understanding of the invention.

Float valves have been described in which a float arm may be provided in a variety of linear curved and bent configurations to suit the spatial arrangements of a particular water storage unit. However, each described float arm is not adapted for a variety of different structural configurations, but is adapted to suit on one particular configuration. Furthermore, float valves have been described in which a float valve body requires an additional hinge location of a valve arm and an additional split pin to stop movement of the valve arm. These features add to the cost of the valve and complexity of the valve assembly. Also, float valves have been described with a small diameter inlet to reduce the flow rate of water through the valve as a valve arm assembly could not handle higher flow rates. This reduction in flow rate of water is undesirable.

An object of the present invention is to ameliorate one or more of the aforementioned disadvantages of the prior art or to at least provide a useful alternative thereto.

STATEMENT OF INVENTION

The invention according to one or more aspects is as defined in the independent claims. Some optional and/or preferred features of the invention are defined in the dependent claims.

Accordingly, in one aspect of the invention there is provided:

A valve adapted for use with a valve arm and a float, the valve including:

- a valve body including:
  - a valve inlet and a valve outlet;
  - a valve channel and a valve piston channel;
  - a valve arm hinge mounting member; and
  - a valve body contact surface,
- a pivoting connection adapted to accommodate a valve arm hinge connecting the valve arm to the valve body, the valve arm being of a type having a remote first end adapted to attach to the float and a second end having a terminal portion adapted to extend beyond the valve arm hinge; and
- a valve piston adapted to move linearly in the valve piston channel, the valve piston including a first valve piston end adapted to contact the valve arm and a second valve piston end adapted to form a seal over part of the valve channel to resist or stop flow of fluid through the valve channel, the second valve piston end being adapted, in a closed position, to apply a sealing force against a pressurised fluid contacting the second valve piston end, wherein:

- the valve piston is adapted to move from an open position to the closed position upon force being applied to the first valve piston end by the valve arm moving from a lower valve arm position to a higher valve arm position thereby being adapted to restrict or stop fluid flow through the valve channel;
- the valve arm hinge is positioned so that the second end terminal portion is adapted to abut the valve body contact surface in the open position to limit the rotational travel of the valve arm about the valve arm hinge; and
- the valve arm hinge mounting member does not include a detent means in the form of an aperture or stop means that is offset from and parallel to an axis of the valve arm hinge.

ALTERNATIVES, OPTIONS AND PREFERMENTS

The valve arm may be made of a single piece or multiple pieces. Preferably, the valve arm is made of a single piece. The valve arm may substantially or entirely be made of plastic, metal, wood or a composite of different materials. Preferably the valve arm is made of metal, most preferably stainless steel. The valve arm may include a solid cylindrical rod, a hollow cylindrical rod, a square bar, a rectangular bar, a beam with an I shaped cross section, a beam with a T shaped cross section or other supporting structures. Preferably, the valve arm includes a solid cylindrical rod. The valve arm may include a bent section, such as cylindrical rod with a bend. The valve arm may include an angle section. Preferably, the valve arm includes a bent section, preferably a bend between 70 degrees and 110 degrees, more preferably between 85-95 degrees, and most preferably a bend of 90-92 degrees.

The float level adjuster may be made of a single piece or multiple pieces. Preferably, the float level adjuster is made of a single piece. The float level adjuster may be made of materials including metal, plastic, wood or a composite of different materials. Preferably, the float level adjuster is made of metal, most preferably stainless steel.

The float may be made of a single piece or multiple pieces. Preferably, the float is made of a single piece. The float may be made of materials including metal, plastic, wood, rubber, polystyrene or a composite of different materials. Preferably, the float is made of plastic. The float may have one or more sealed air cavities inside the float. Preferably, the float has a sealed air cavity inside the float. The float may attach to the float level adjuster or the valve arm through a threaded connection, a hole and a pin connection, a cylindrical hole with grub screws, or other interlocking features. Preferably, the float is attached to the float adjuster or valve arm through a threaded connection.

The valve body may be made of a single piece or multiple pieces. Preferably, the valve body is made of a single piece. The valve body may be made of materials including metal, plastic, wood, or a composite of different materials. Preferably, the valve body is made of metal, most preferably stainless steel. The valve inlet and outlet may include threads or other connecting features. Preferably, the valve inlet includes a thread. Preferably, the valve outlet doesn't include any threads or other connecting features.

The valve channel may include bends such as a 90° bend. Preferably, the valve channel includes a 90° bend. The valve channel may include smoothed corners and edges to reduce pressure loss through the valve channel. Preferably, the valve channel doesn't include smoothed corners and edges. The valve piston channel may include a cylindrical channel, square shaped channel or a rectangular shaped channel. The valve piston channel may include slots to receive features on the valve piston. Preferably, the valve piston channel includes a cylindrical channel and does not include slots. The valve piston channel may form part of the valve channel. Preferably, the valve piston channel forms part of the valve channel. There may be a secondary valve piston channel to further contain the motion of the valve piston. Preferably, there is a secondary valve piston channel to further contain the motion of the valve piston.

The valve arm hinge may include a pin or shaft through holes in the valve arm and in the valve body or a ball or other type of bearing. Preferably, the valve arm hinge includes a pin through holes in the valve body and in the valve arm. The pin may be a split pin or other types of pins. Preferably, the pin is a split pin. The valve body may include features to limit movement of the valve arm along the longitudinal axis of the valve arm hinge pin or shaft. Preferably, the valve body includes features to limit movement of the valve arm along the longitudinal axis of the valve arm hinge pin.

The valve piston may be made of one or more pieces. Preferably, the valve piston is made of three pieces. The valve piston may be made of materials including metal, plastic, rubber or wood. Preferably, two parts of the valve piston are made of metal, most preferably stainless steel. Preferably, another part of the valve piston is made of rubber. The valve piston may include one or more cylindrical portions, square shaped portions, rectangular shaped portions or other features which slide in the valve piston channel. The valve piston may include one or more cylindrical pieces, square shaped pieces, rectangular pieces or other shaped pieces which slide in the valve piston channel. Preferably, the valve piston includes two cylindrical pieces which slide in the valve piston channel. The valve body may include other cylindrical channels or slots to receive cylindrical portions or other features on the valve piston. Preferably, the valve body includes other cylindrical channels to receive cylindrical pieces of the valve piston. The valve piston may include none, one or more valve piston seals to stop flow through the valve channel. Preferably, the valve piston includes one valve piston seal to stop flow through the valve channel. The valve piston seal may be contained within the valve body or the valve piston. Preferably, the valve piston seal is contained within the valve piston. The valve piston may form a seal over the valve inlet, valve outlet or part way through the valve channel. Preferably, the valve piston forms a seal part way through the valve channel. The valve piston seal may contact a sealing ring surface or other sealing surfaces on the valve body. Preferably, the valve piston seal contacts a sealing ring surface on the valve body. The valve piston seal may be made of rubber, silicone, elastic plastic or other elastic materials. Preferably, the valve piston seal is made of rubber. The valve piston seal may be attached to other components of the valve piston with a press fit, screw or other attachment methods. Preferably, the valve piston seal is attached to other components of the valve piston with a press fit. The valve piston may stop flow of fluid through the valve channel when the valve piston is in the closed position. The valve piston may limit the flow of fluid through the valve channel when the valve piston is in the closed position. Preferably, the valve piston stops the flow of fluid through the valve channel when the valve piston is in the closed position.

The fluid may be water, or other fluids. Preferably, the fluid is water. The fluid may have a high pressure or a low pressure. Preferably, the fluid has a high pressure, such as typical mains water pressure. "Pressurised fluid" includes fluid pressurised by natural forces, including gravity.

The valve arm is adapted to move from a first valve arm position corresponding to the closed position of the valve to a second valve arm position corresponding to the open position of the valve. The first valve arm position may be an angle of the valve arm wherein the float is above the valve body. The first valve arm position may be an angle of the valve arm wherein the float is vertically level with the valve body. The first valve arm position may be an angle of the valve arm wherein the float is below the valve body. Preferably, the first valve arm position is at an angle of the valve arm wherein the float is vertically level with the valve body. The second valve arm position may be an angle of the valve arm wherein the float is above the valve body. The second valve arm position may be an angle of the valve arm wherein the float is vertically level with the valve body. The second valve arm position may be an angle of the valve arm wherein the float is below the valve body. Preferably, the second valve arm position is an angle of the valve arm wherein the float is below the valve body. The second valve arm position may be a range of positions, such as below an angle of the valve arm. Preferably, the second valve arm position is a range of positions below an angle of the valve arm.

The float is preferably adapted to have enough buoyancy in the fluid to lift itself and the valve arm. The float is preferably operable to be positioned inside a tank. The float may have more or less than half the density of the fluid. Preferably, the float has less than half the density of the fluid. The float may be attached directly to the first end of the valve arm.

Alternatively, the float is preferably attached to a float level adjuster. The float level adjuster is preferably attached to the second end of the valve arm. The float level adjuster preferably includes one or more mounting surfaces, wherein the mounting surfaces connect the float level adjuster to the valve arm.

The float level adjuster may be oriented parallel with the valve arm. The float level adjuster may be orientated perpendicular to the valve arm. The float level adjuster may be orientated at other angles to the valve arm. The float level adjuster may be able to be orientated at multiple angles to the valve arm. Preferably, the float level adjuster is able to be orientated perpendicular, parallel and at 45 degrees to the valve arm. The float level adjuster may include one mounting surface to the valve arm. The float level adjuster may include more than one mounting surface to the valve arm. Preferably, the float level adjuster includes three mounting surfaces to the valve arm. The mounting surfaces may be located at multiple locations along the length of the float level adjuster. The mounting surfaces may be located at one location on the length of the float level adjuster. Preferably, the mounting surfaces are located at multiple locations along the length of the float level adjuster. The float level adjuster may have threads at each end of the float level adjuster. Preferably, the float level adjuster has a single thread at one end of the float level adjuster. Male and female threads at each end of the float level adjuster may fit into each other in series to form a chain of float level adjuster pieces between the valve arm and the float. Matching holes and shafts at each end of the float level adjust may fit into each other in series to form a chain of float level adjuster pieces between the valve arm and the float.

The valve arm hinge mounting member does not include a detent means in the form of an aperture or stop means that is offset from and parallel to an axis of the valve arm hinge. Instead, the valve body includes a wall aligned substantially parallel to the axis of the valve arm that impedes the rotation of the terminal portion when the valve arm reaches the open position. The second end of the valve arm includes the terminal portion. The terminal portion is preferably relative short and is defined as the portion of the second end that is on the other side of the valve hinge 14, being the portion between the valve hinge and the very end of the second end. The length of the terminal portion may be defined by a distance B. If the diameter of the valve arm is X, the distance B from a centreline extending coaxially through a hole or aligned holes in the valve body 11 (the axis of the holes forming part of the valve hinge) to the second hinged end of the valve arm is 0.5X⇐B>=X, and preferably about 0.7X. Advantageously, the dimension of B=0.7X. The distance (dimension A) from the centreline through the holes in the valve body to the valve body contact surface is also 0.5X⇐A>=X, and preferably about 0.7X. Advantageously, the dimension of A=0.7X. Still more preferably, the dimensions A=0.7X and B=0.7X. The ratio of dimension A to dimension B is preferably 1:1. The ratios of (1) the diameter of the valve arm 20 to (2) dimension A to (3) dimension B is advantageously 10:7:7.

The second end of the valve arm may be adapted to contact the valve body at a valve arm angle. The valve arm angle ⊖ is an angle between the valve arm in the open position and the valve arm in the closed position and provides an expression of the extent of rotation of the valve arm between the open and closed positions. Advantageously, the valve arm cannot go below the second open valve arm position. Furthermore, the second end of the valve arm may contact the valve body at a valve arm angle so that the movement of the valve arm cannot go beyond the valve arm angle relative to its orientation in the closed position. The valve arm angle may be greater, less than or equal to 30° below the horizontal. Preferably, the valve arm angle is between 20' and 40° below the horizontal.

The valve outlet may be on the top, sides and/or base of the valve body. Preferably, the valve outlet is on the base of the valve body. Preferably, the valve channel is covered by a shroud unitarily formed into the valve body, around the whole valve channel accept the base to stop water exiting the valve channel upwards or to the side.

BRIEF DESCRIPTION OF THE DRAWINGS

The invention may be better understood from the following non-limiting description of preferred embodiments, in which.

DETAILED DESCRIPTION OF THE DRAWINGS

Figure 1:
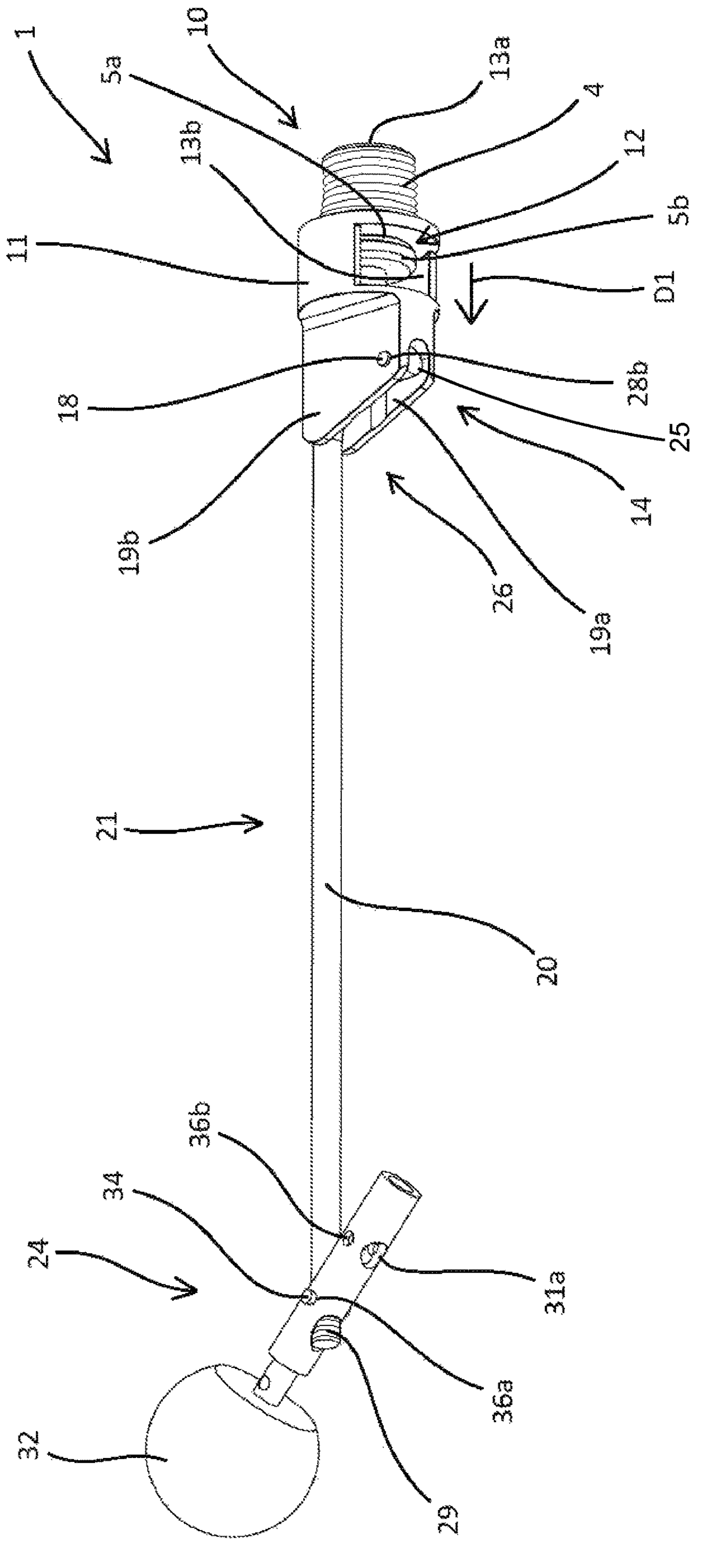
FIG. 1 is a perspective view of the valve with the valve arm in a first valve arm position.

Preferred features of the present invention will now be described with particular reference to the accompanying drawings. However, it is to be understood that the features illustrated in and described with reference to the drawings are not to be construed as limiting on the scope of the invention.

Referring to the drawings, a valve 1 is shown that includes a valve device 10, a valve arm 20, a float level adjuster 30 and a float 32.

The valve 1 includes a valve device 10, a valve arm 20 and a float 32. The valve device 10 includes:

- a valve body 11 including a valve inlet 13*a,* a valve outlet 13*b,* valve channel 15 and a valve piston channel 16*a;*
- a pivoting connection including a valve arm hinge 14 connecting the valve arm 20 to the valve body 11; and
- a valve piston 12 which moves linearly in the valve piston channel 16*a,* the valve piston 12 including a second valve piston end 17*b* adapted to form a seal over part of the valve channel 15 to restrict or stop flow of fluid through the valve channel 15, The valve device 10 further includes a first valve piston end 17*a* which contacts the valve arm 20. The valve piston 12 is adapted to move on application of a force by a pressurised fluid to the second valve piston end 17*b.* The movement of the valve arm 20 from a first closed position (FIG. 3) to a second open position (FIG. 4) allows the valve piston 12 to move, under the force applied to the second valve piston end 17*b,* allowing fluid to flow through the valve channel 15. A second end 26 of the valve arm 20 contacts the valve body 11 at a valve arm 20 angle ⊖ so that the valve arm 20 cannot go below the valve arm angle ⊖.

In use, the float 32 is adapted, in the first closed position (FIG. 3), to be above the second open position of the float 32 when in the second valve arm position. The float 32 is positioned inside a tank 40 and has enough buoyancy in the fluid to lift itself and the valve arm 20;

The configuration of the valve device 10 is such that, if fluid in the tank 40 goes below a critical tank fluid level, the valve arm 20 is adapted to move from the first valve arm position to the second valve arm position.

The float 32 may be attached directly to a first end 24 of the valve arm 20 or the float 32 may be attached to the float level adjuster 30. The float level adjuster 30 is preferably attached to the second end 26 of the valve arm 20. The float level adjuster 30 includes one or more mounting surfaces. The mounting surfaces connect the float level adjuster 30 to the valve arm 20.

The valve arm hinge 14 connects the valve arm 20 to the valve body 11 through a pivoting connection.

The valve piston 12 moves linearly in the valve piston channel 16*a* and includes the second valve piston end 17*b,* which can form a seal over part of the valve channel 15 to stop flow of fluid 52 through the valve channel 15.

Further, in use, a pressurised fluid may contact and apply a force to the second valve piston end 17*b.*

Figure 2:
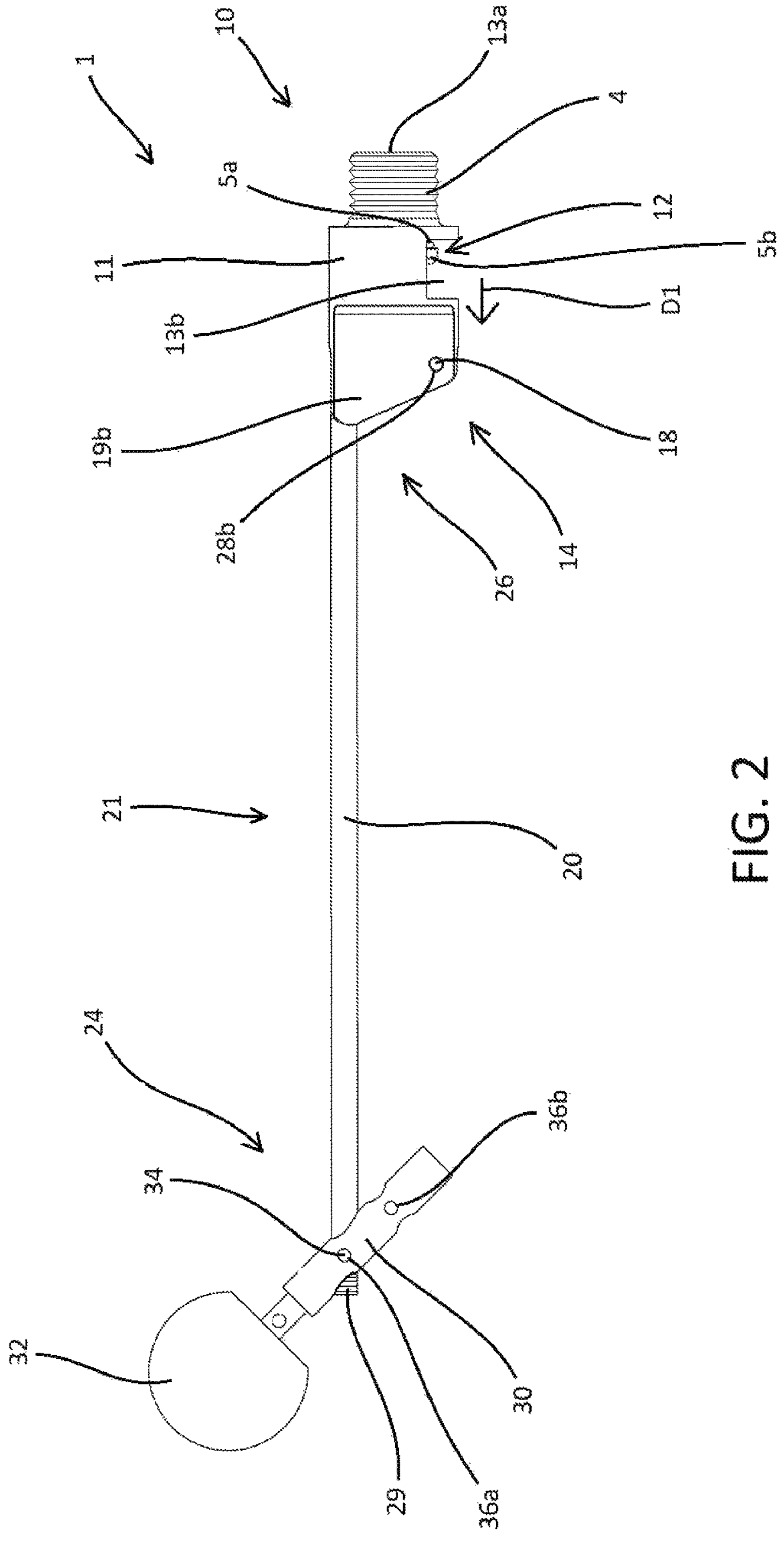
FIG. 2 is a front view of the valve with the valve arm in the first valve arm position.
Figure 3:
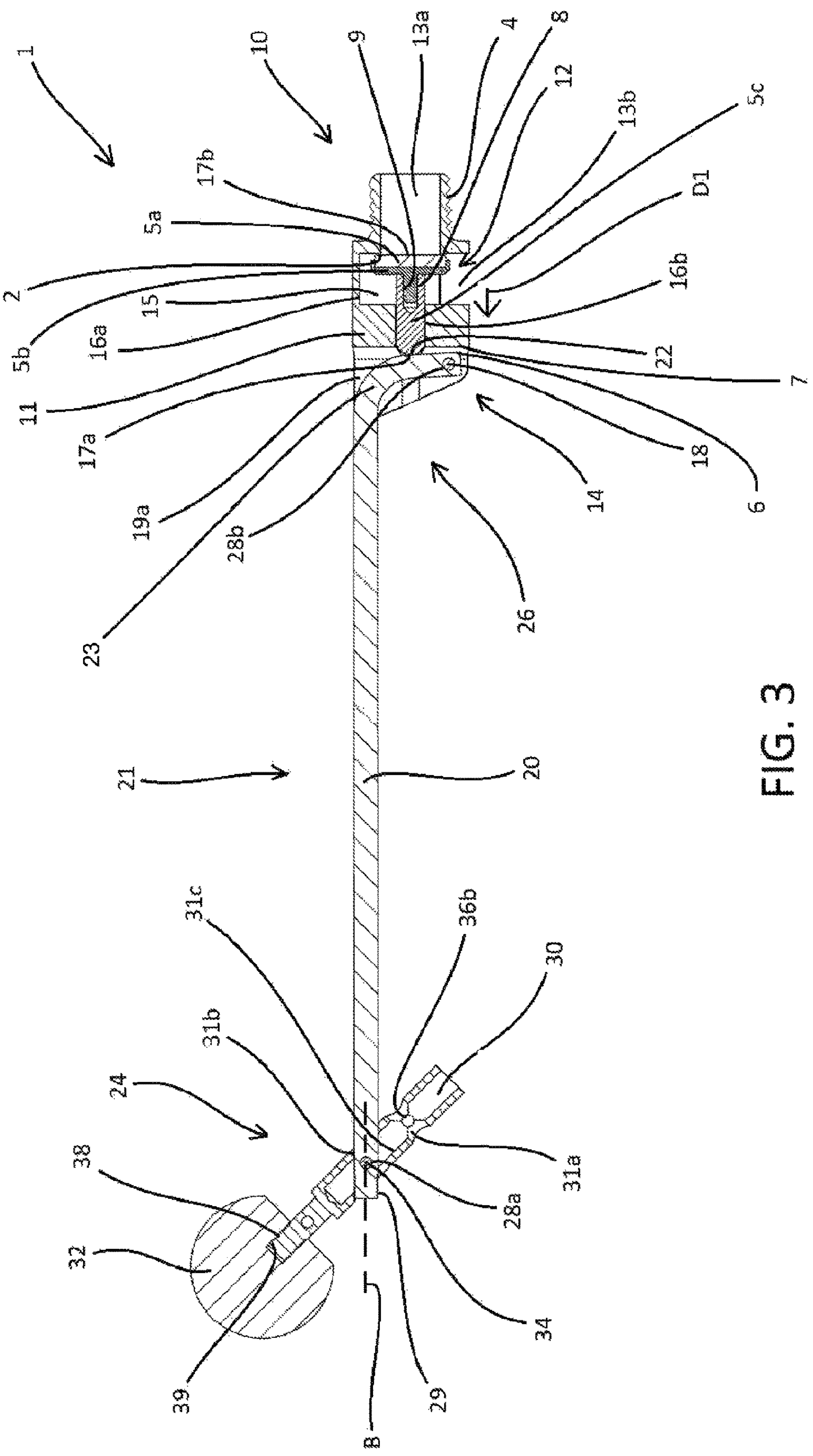
FIG. 3 is a cross section view of the front of the valve with the valve arm in the first valve arm position.
Figure 4:
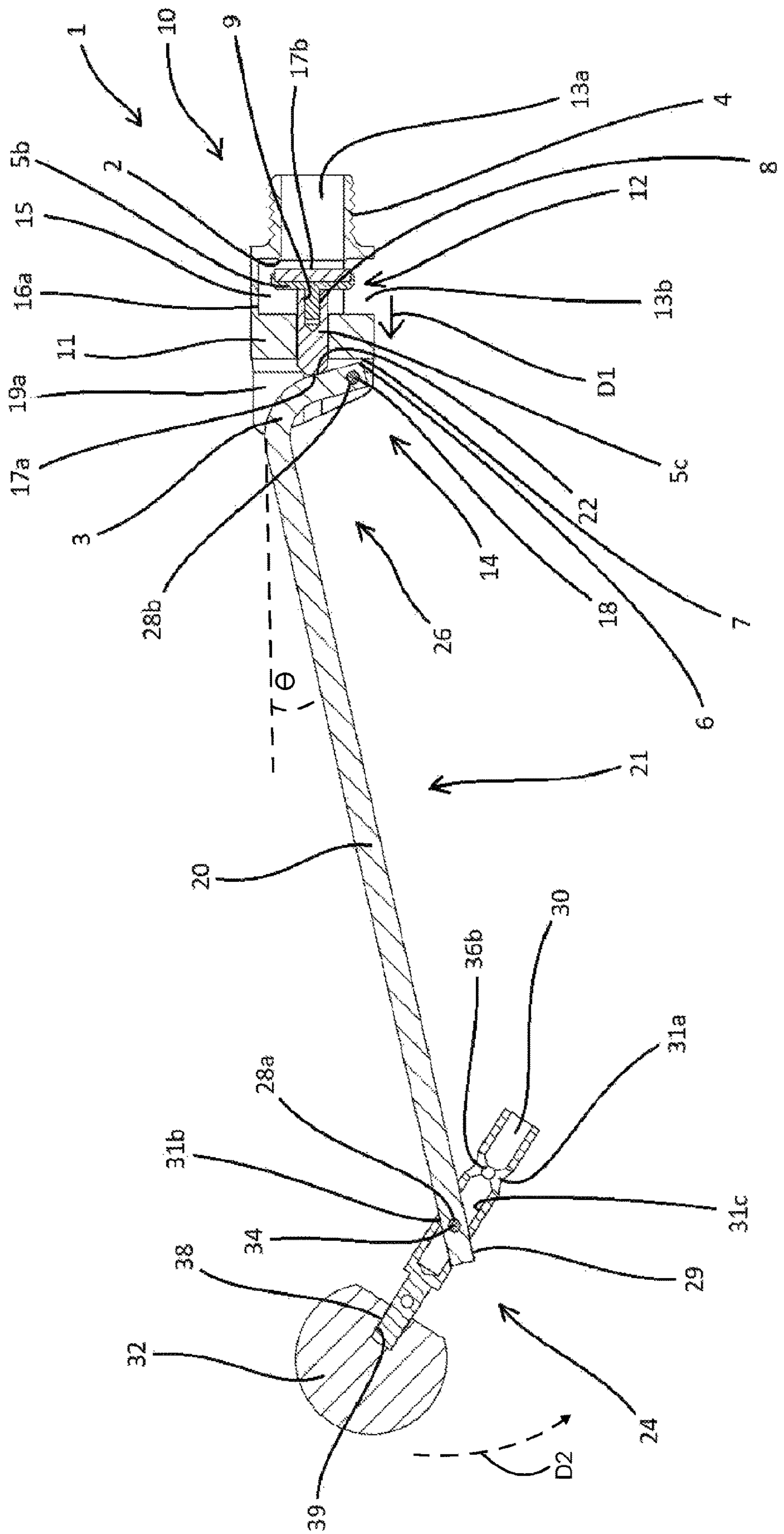
FIG. 4 is a cross section view of the front of the valve with the valve arm in a second valve arm position.

Movement of the valve arm 20 from the first closed valve arm position (as seen in FIG. 1-3 and FIG. 5 where the float 32 is elevated) to a second open valve arm position (as seen in FIG. 4 where the float 32 is lowered with the low level of fluid) allows the valve piston 12 to move. Under the force applied to the second valve piston end 17*b*, the valve piston 12 is adapted to move from the first closed position (FIGS. 1-3 and 5) to the second open position (FIG. 4) and allows fluid 52 to flow through the valve channel 15.

The float 32 in the first closed valve arm position (FIG. 5) is above the position of the float 32 when in the second valve arm position (FIG. 4)[i]. The adjuster 30 is optionally fixed relative to the float 32 in one desired configuration of the many possibilities. This enables the float 32 to be positioned, relative to the valve body 11, at any one of a multiple of different orientations.

The float 32 has enough buoyancy in the fluid 52 to lift itself, the float level adjuster 30, and the valve arm 20 through an arc within its range of positions inside a water storage unit, such as a tank 40. If fluid 52 in the tank 40 goes below a critical tank fluid level 54, the valve arm 20 is adapted to move from the first valve arm position to the second valve arm position. There is the option that the adjuster 30 can be inserted between components at either of two or more alternative locations, so that the elevation or positioning of the float 32 relative to the valve 11 can be changed to suit a particular in situ application. The adjuster 30 can be attached between the float 32 and another float level adjuster 30, or between the valve arm 20 and the float 32. Alternatively, the float 32 is attached directly to the valve arm 20.

Figure 5:
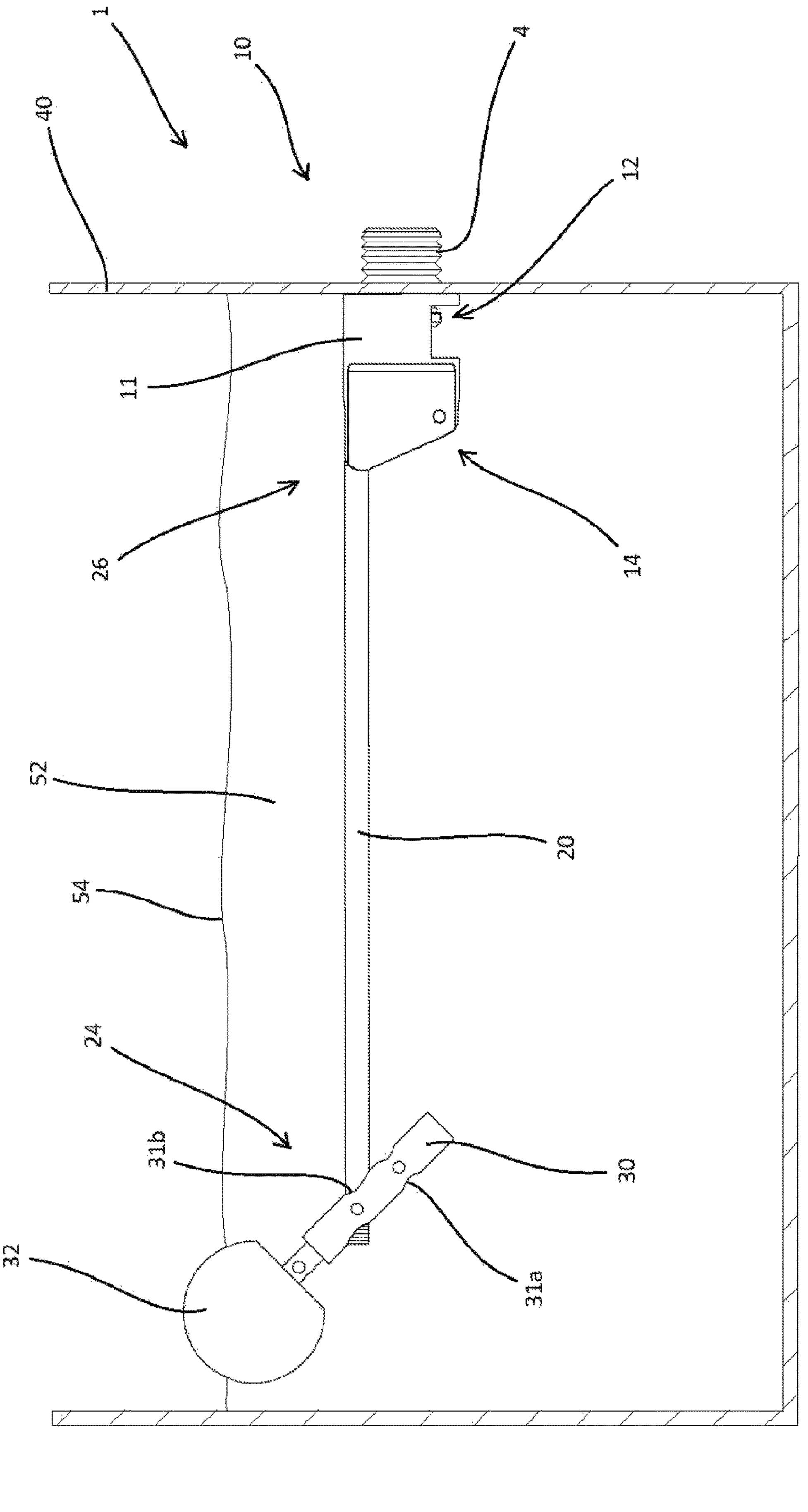
FIG. 5 is a cross section view of the front of the valve inside a tank with the valve arm in the first valve arm position and the fluid at the critical tank fluid level.

The valve 1 is placed inside a tank 40 when in use as seen in FIG. 5. A hose or other water pipe fitting is connected to the valve inlet 13*a* through a valve body thread 4. The valve body thread 4 may be made in a range of sizes, for example 2 inch, 1½ inch, 1¼ inch, 1 inch, and ¾ inch. This supplies pressurised water to the valve inlet 13*a*. This pressurised water applies pressure to the valve piston 12 but the valve piston 12 does not move from the closed position (seen in FIG. 1-3 and FIG. 5) when the valve arm 20 is in the first valve aim position. This is because a valve arm contact surface 22 is contacting the first valve piston end 17*a* when the valve arm 20 is in the first valve arm position. When the valve piston 12 is in the closed position, a valve piston seal 5*a* makes a seal over the valve channel sealing surface 2. This stops any water coming through the valve channel 15 when the valve piston 12 is in the closed position.

The valve piston 12 is made of 3 parts, the valve piston seal 5*a*, a valve piston body 5*b* and a valve piston insert 5*c*. The valve piston seal 5*a* is attached to the valve piston body 5*b* through a press fit and the valve piston body 5*b* is not attached to the valve piston insert 5*c* (they only contact each other). The valve piston insert 5*c* keeps the valve piston body 5*b* inside the valve body 11 due to a spigot 8 on the valve piston body 5*b*. The spigot 8 is kept inside a hole 9 in the valve piston insert 5*c*. The valve piston insert 5*c* is kept inside the valve piston secondary channel 16*b* because the valve arm contact surface 22 blocks the path of the valve piston insert 5*c* that would otherwise tend toward exiting the valve piston secondary channel 16*b*. The valve arm 20 is adapted not to go below the valve arm angle ⊖. The valve arm 20 is adapted not to go above the horizontal so that the valve arm contact surface 22 is adapted to stop the valve piston insert 5*c* exiting the valve piston secondary channel 16*b*. The valve arm 20 angle ⊖ is in a range of between 20° and 40° below the horizontal.

The second end 26 has a short terminal portion 25 on the other side of the valve hinge 14. The length of the terminal portion 25 is defined by a distance B. If the diameter of the valve arm 20 is X, the distance B (dimension B in FIG. 9) from a centreline extending coaxially through a pair of aligned holes 28*b* in the valve body 11 (the axis of the holes 28*b*) to the second hinged end 26 of the valve arm 20 is advantageously 0.7X. The distance (dimension A) from the centreline through the two holes 28*b* in the valve body 11 to the valve body contact surface 7 is advantageously 0.7X. The ratio of dimension A to dimension B is advantageously 1:1. The ratios of (1) the diameter of the valve arm 20 to (2) dimension A to (3) dimension B is advantageously 10:7:7.

When the water level in the tank 40 is above the critical tank fluid level 54, the valve arm 20 is in the first valve arm position. This is due to the buoyancy of the float 32 pushing the valve arm 20 upwards. The valve arm 20 doesn't go above the first valve arm position due to the valve arm contact surface 22 contacting the first valve piston end 17*a*.

Figure 8A:
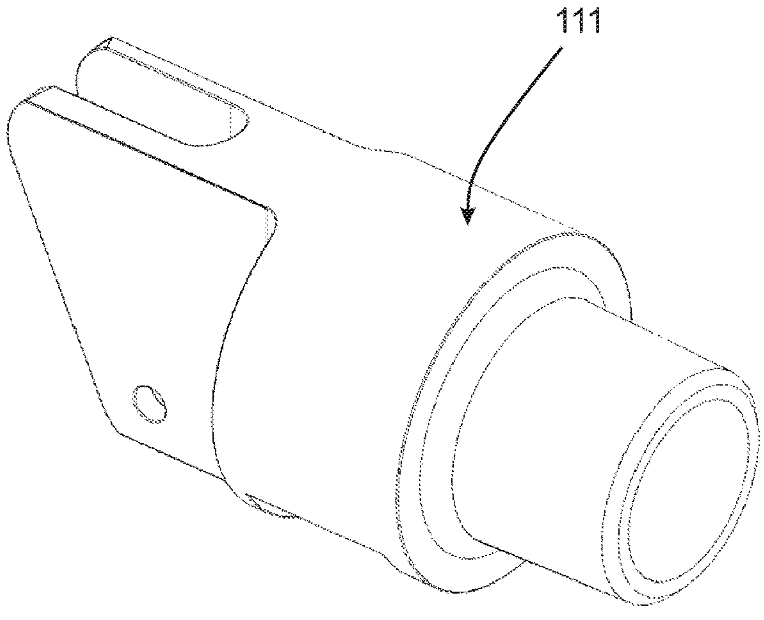
FIGS. 8*a,c* and *d* are perspective views of a valve body according to an aspect of the invention.
Figure 8B:
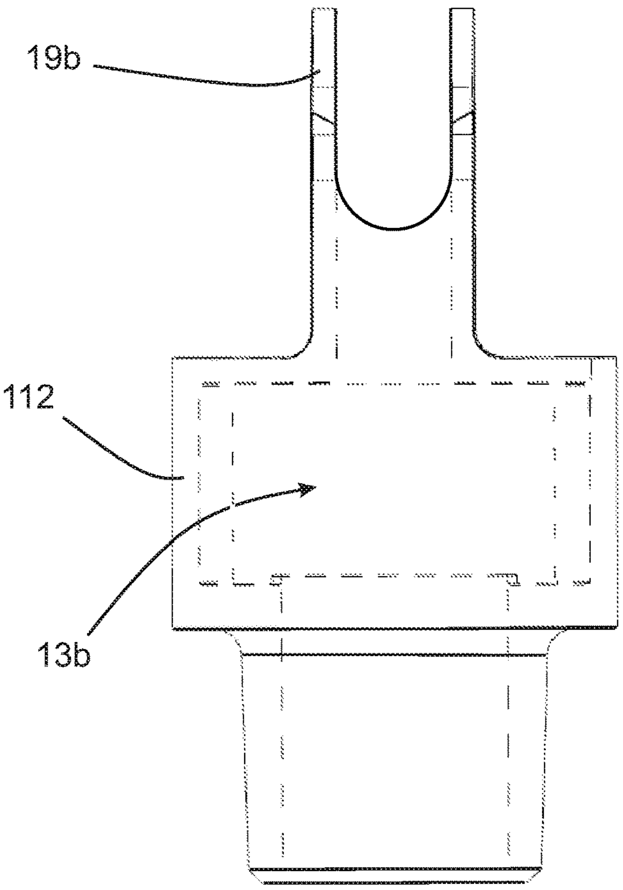
FIG. 8*b* is a bottom plan view of the valve body shown in FIG. 8*a;*
Figure 8C:
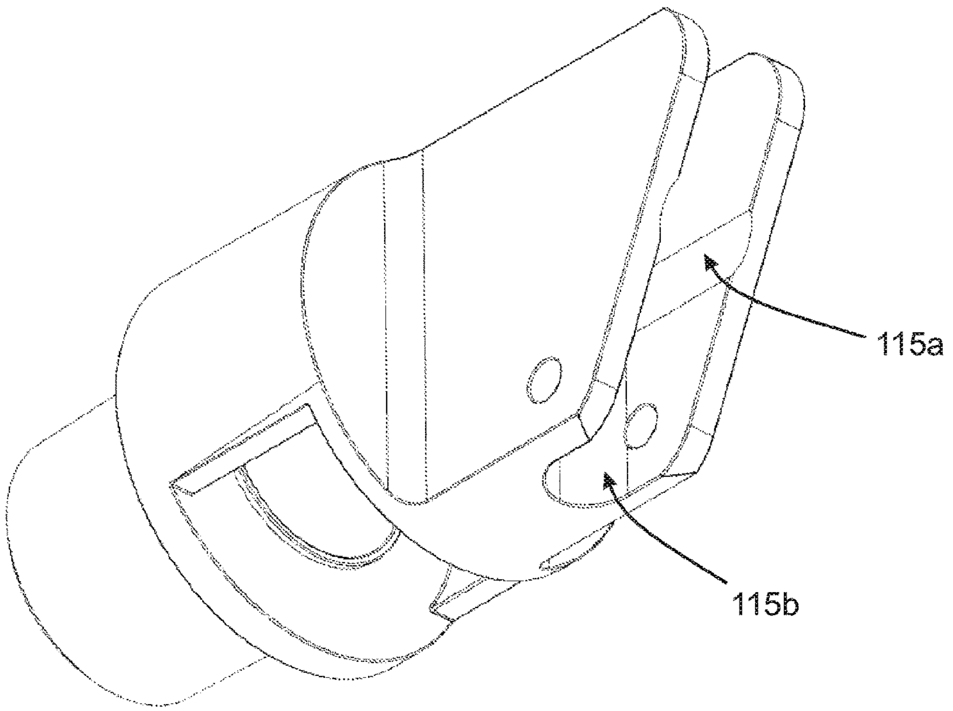
FIG. 8*e* is a n axial sectional view of the central cylinder.
FIG. 8*f* is side sectional view of the valve body shown in FIG. 8*a.*
Figure 8D:
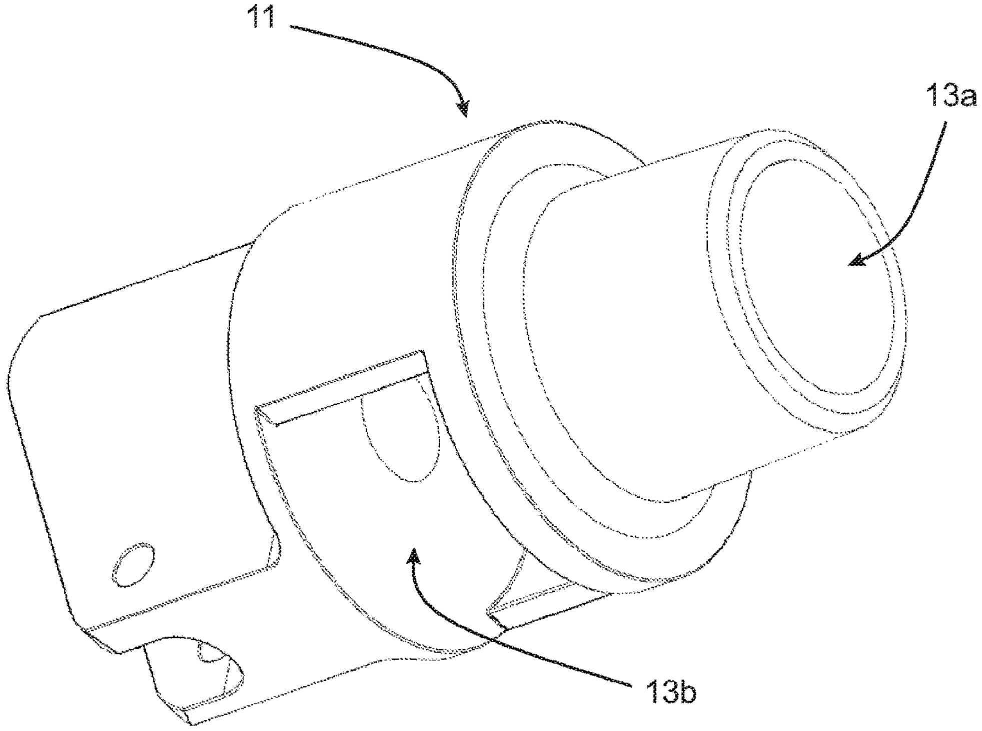
Figure 8E:
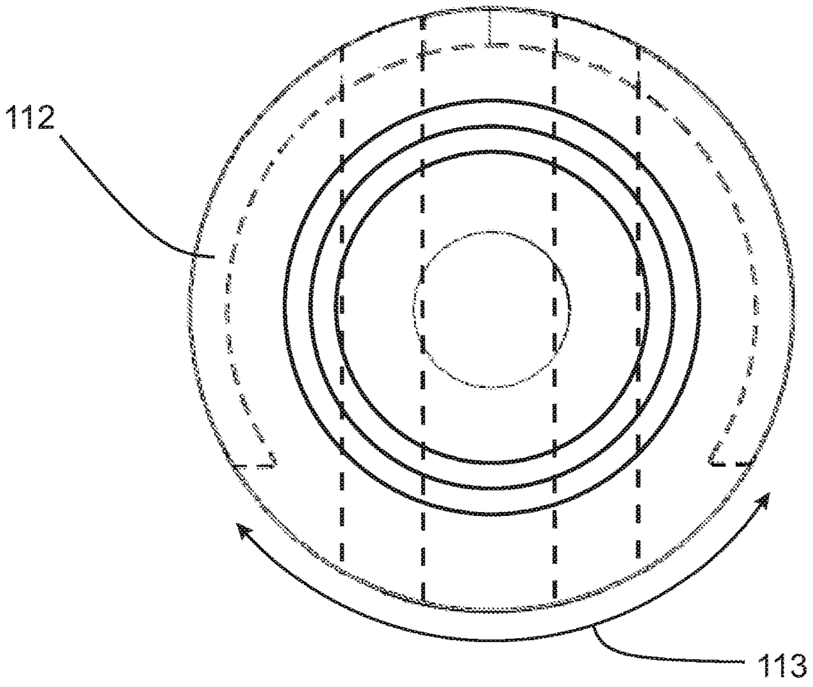

When the water level in the tank 40 falls below the critical tank fluid level 54, the valve arm 20 moves downwards to the second valve arm position (which is any position of the valve arm 20 below the first valve arm position). The valve arm 20 pivots about the valve arm hinge 14 as it moves. The valve arm hinge 14 includes a valve body pin 18 inserted through two holes 28*b* in the valve body 11 and one hole 28*b* in the valve arm 20. Motion of the valve arm 20 along the longitudinal axis of the valve body pin 18 is contained through the agency of a first and second valve body plates 19*a*, 19*b* that, as can be determined by considering the structure and shape of the valve body 11,111 shown in FIGS. 8*a*-9 and the description herein, axially constrain the travel of the second end 26 of the valve arm 20 along the pin 18 and between the plates 19*a*,*b*. As can be determined by considering the structure and shape of the valve body 11,111 shown in FIGS. 8*a*-9 and the description herein, the extent of downward rotational movement of the valve arm 20 about the axis of the valve body pin 18 is constrained by the valve body contact surface 7 and the upward rotational movement of the valve arm is constrained by the second end 26 abutting the valve piston insert 5*c* at the full axial extent of travel of the valve piston 12 at the first closed position.

As shown in Fig. the valve arm 20 is shown in the form of a rod including the second valve arm end 26. The valve arm 20 does not fall below 45 degrees below the horizontal even when the water level is below the valve 1. This is because the terminal portion 25 at the very end of the rod 6 contacts the valve body contact surface 7 when the valve arm 20 reaches the valve arm angle ⊖ from or relative to the valve arm 20 in the closed position, which may correspond to the main linear section 21 being aligned horizontally. The valve arm 20 advantageously does not fall below the valve arm angle ⊖ during operation because, otherwise, the valve piston insert 5*c* will fall out. That is the extent of rotation of the valve arm 20 is limited to retain the valve piston 12 with the valve piston secondary channel 16*b*. The distance between the first hole 28*b* in the valve arm 20 and the end of the rod 6 and the distance between the valve arm hinge 14 and the valve body contact surface 7 were chosen specifically. The very end of the rod 6 corresponding the tip of the terminal portion 25 therefore contacts the valve body contact surface 7 when the valve arm is angled at the valve arm angle ⊖ below the horizontal. This negates the need for additional detents, stoppers, weld spots, lugs, split pins and holes in the valve body 11 to stop the valve arm 20 falling below the valve arm angle ⊖ below the horizontal. Prior art valve bodies included two additional split pins and holes so that the prior art valve could be for use with high pressure or low pressure water supplies. Dispensing with the need for additional split pins reduces the cost of manufacturing and makes the valve device 10 simpler to assemble.

Figure 9:
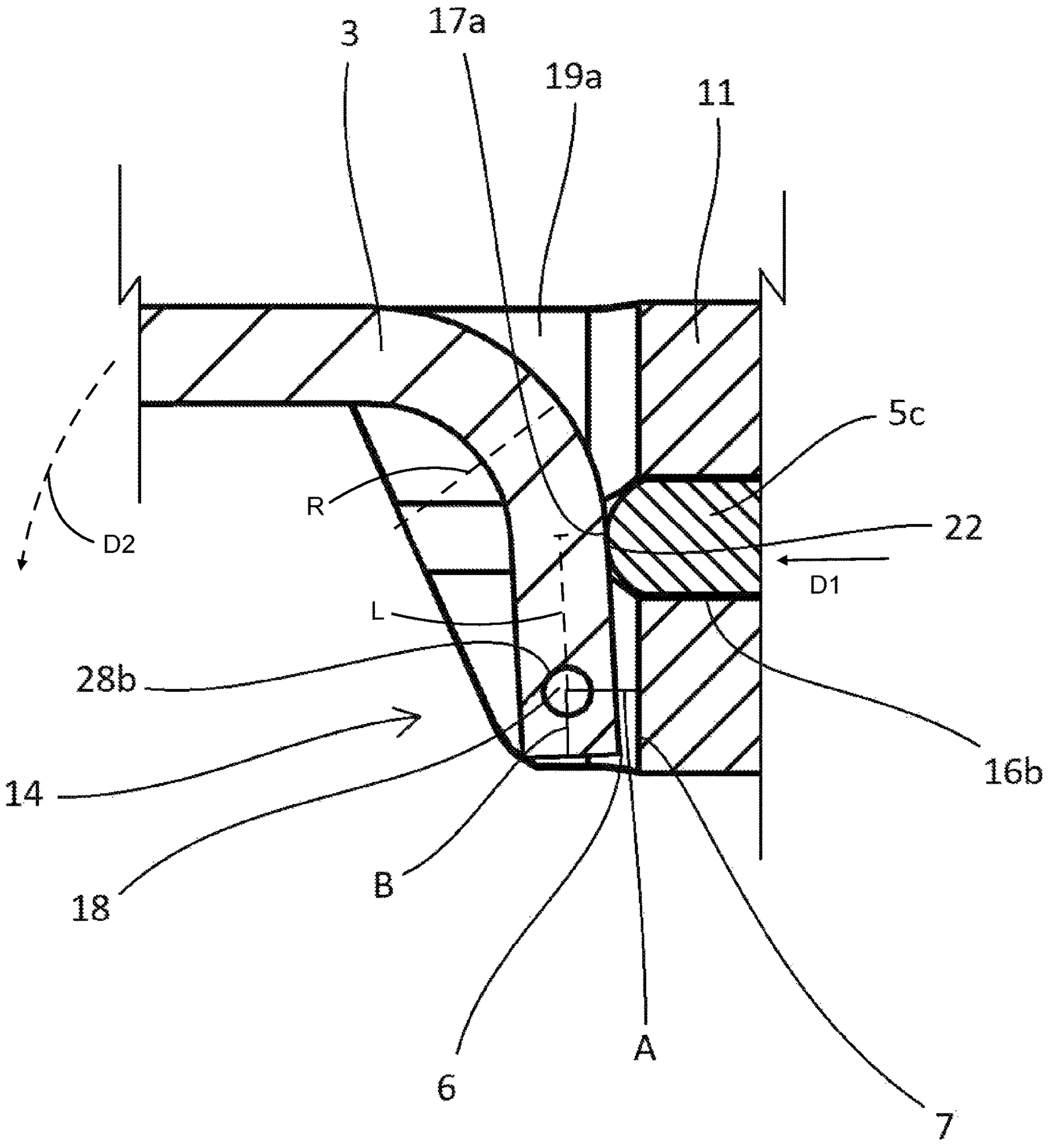
FIG. 9 is a cross section front view of the valve with the valve arm in the first position.

The valve arm 20 comprises a main linear section 21 extending between the float level adjuster 30 and a bend 23 transitioning the valve arm 20 through from the linear section 21 and the second 26. The linear section 21 and the second end 26 are set at a substantially normal angle relative to each other, and particularly are preferably set at an angle of about 90-90°. Furthemore, the lengths of the straight sections of the valve arm 20 either side of the 90-92° bend 23 are configured and dimensioned such that the vertical force applied by the float 32 onto the valve arm 20 is enough to hold up to 1000 kPa of water pressure in the valve inlet 13*a*. This is because the force applied to the valve piston 12 from the valve arm 20 is dependant on the lengths of the straight sections of the valve arm 20 either side of the 90-92° bend 23 as well as the depth of water in the tank 40. As illustrated in FIGS. 3, 4 and 9, the relative length of the main linear section 21 and a leverage distance L between the valve arm contact surface and the valve aim hinge 14 determines the leverage applied through the second end 26 that is derivable from the float's 32 force applied to the first end 24. Having a long main linear section 21 and a short leverage distance L means that a corresponding large force can be applied through the valve arm 20 to the valve piston insert 5*c* whilst accommodating only a short range of axial travel of the valve piston 12.

1000 kPa is the industry standard maximum pressure for use with valve devices of the type embodying the invention, as exemplified in the form of the valve device 10. The prior art solution to the problem of dealing with high pressures is to reduce the relative diameter of the inlet to deal with high pressures in the valve inlet. However, this reduces the potential flow rate through the valve body. The current valve device 10 delivers a flow rate of 4 litres per second at 200 kPa. Also, the current valve device 10 has an inlet 13*a* internal diameter approximately 2-3 times the corresponding prior art inlet diameter. the current valve device 10 has an inlet 13*a* internal diameter of approximately 25 mm compared to prior art internal inlet diameters as low as 8 mm.

As the first end 24 of the valve arm 20 moves substantially through a vertical plane, the hinged second end 26 of the valve arm 20 moves through an arc in a vertical plane. The arc is very small, such that, in effect, the main linear section 21 of the valve arm 20 moves substantially horizontally. The 90-92° bend 23 in the valve arm 20 joins the second end 26 of the valve arm 20 to the main linear section 21. Therefore, as the valve arm 20 moves downwards from the first valve arm position to the second valve arm position, the valve arm contact surface 22 (which is on the second hinged end 26 of the valve arm 20) moves away from the valve piston 12 (in rotational direction D2).

The plates 19*a,b* form a pair of spaced and parallel flanges that extend rearwardly of the valve body 11. The plates 19*a,b* form a channel or corridor within which the hinged second end 26 of the valve arm 20 reciprocates through a limited rotational arc. The reciprocation of the hinged second end 26 is governed by the valve piston end 17*a* and its action on the contact surface 22. The contact surface may be cam-shaped or ramped to provide a smooth and curved surface over which the first valve piston end 17*a* rides. As shown in FIG. 9, the outward curve in the bend 23 terminates at the valve arm contact surface 22. The bend 23 has an outward radius R. The outward curve of the bend 23 can be used as a cam surface to vary the relationship between the extent of rotation of the second end 26 about the valve arm hinge 14 relative to the extent of travel of the valve piston 12, thereby enabling the relationship to be varied from a proportionally linear relationship. Preferably, the valve arm contact surface 22 is in the region of a linear portion of the second arm 26. In the first closed position, the valve arm 20 may be oriented in situ substantially horizontally. As shown in FIG. 9, the linear portion of the second end 26 may be inclined away or offset from the vertical away from valve piston insert 5*c*. The first valve piston end 17*a* is rounded at its end, preferably in a hemispherical shape. Accordingly, as the valve arm contact surface 22 rotates away from the valve inlet 13*a*, the lower half of first valve piston end 17*a* bears continually on the valve arm contact surface 22.

Since the valve piston 12 is under pressure from pressurized water in the valve inlet 13*a*, as the valve arm contact surface 22 moves in the rotational direction D2, the valve piston 12 correspondingly moves in a linear direction D1. The motion of the valve piston 12 is limited to the longitudinal axis of the valve piston 12 through the valve piston channel 16*a* and the valve piston secondary channel 16*b*. As the valve piston 12 moves in linear direction D1, water can flow through the valve channel 15.

As water flows through the valve channel 15, out the valve outlet 13*b* and into the tank 40, the water level in the tank 40 rises until the water level reaches the critical tank fluid level 54 again. At the critical tank fluid level 54, the valve arm 20 is back to the first valve arm position (see FIG. 5) since the float 32 and the water level in the tank 40 determine the position of the valve arm 20. When the valve arm 20 is back in the first position (see FIG. 5), the valve piston 12 has moved back into the closed position and stops the flow of water through the valve channel 15 again. Therefore, the valve 1 is adapted to maintain the water level in the tank 40 at the critical tank fluid level 54.

Figure 6:
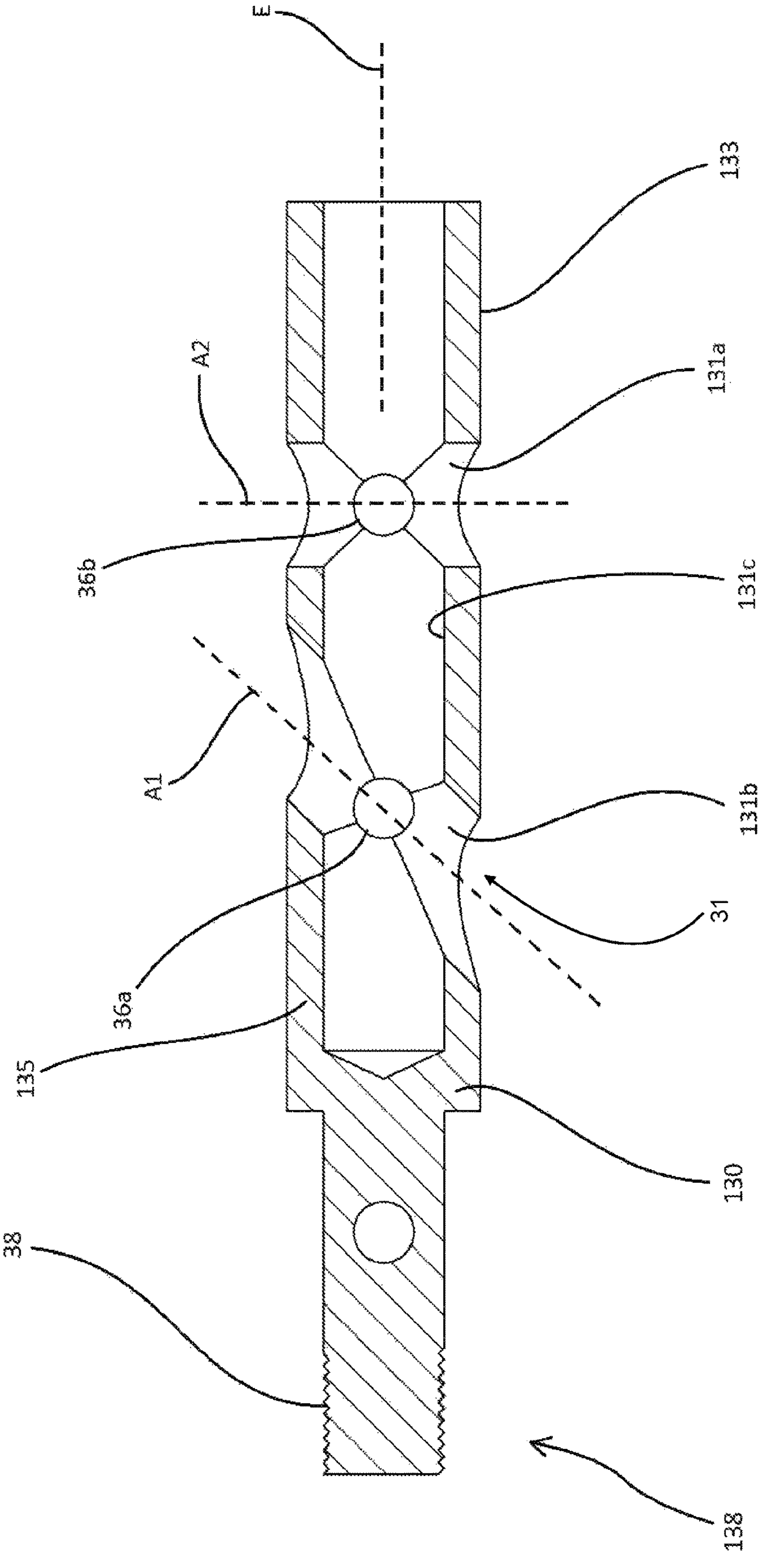
FIG. 6 is a side sectional view of an adjuster according to one aspect.

The float level adjuster 30 includes one or more mounting surfaces 31. The mounting surfaces 31 may be in the form of mounting surfaces 31*a*, 31*b*, 31*c*. Referring to FIG. 6, in this embodiment the mounting surfaces of a float level adjustor 30 are in the form of bores 131*a-c*. The mounting surfaces 31*a*, 31*b*, 31*c* connect the float level adjuster 30 to the valve arm 20 at the remote first end 24 of the valve arm 20. The float level adjuster 30 has a male thread 38 at an upper end extending coaxially with the main body portion 130 of the adjustor 30. The male thread 38 is attached to the float 32 by a female thread 39 in or of the float 32 that engages with the adjuster's male thread 38.

The float 32 can be positioned higher or lower relative to the valve arm 20 by mounting the valve arm 20 to the float level adjuster 30 at the first mounting surface 31*a*, the second mounting surface 31*b* or the third mounting surface 31*c* (or by mounting the float 32 directly to the valve arm 20, whereby the remote first end is male threaded or otherwise presents a spigot receivable in a bore in the float 32). The various mounting surface 31*a-c* options enable a change of the position of the float 32 relative to the position of the valve arm 20 and enable a consistent positioning of the valve body 11 relative to the tank 40 for ease of installation.

Also, the float level adjuster 30 may include multiple pieces (i.e. multiple adjuster modules). The multiple adjusters 30 can be mounted in series. The multiple adjusters 30 can form a chain or branched array of like adjusters 30. These can be used to raise or lower the float 32 to a desired position relative to the valve arm 20 or the valve body 11.

The valve arm 20 at its first remote end 24 is attached to the float level adjuster 30 through a float level adjuster pin 34. The pin 34 may be in the form of a split pin. The pin 34 can be inserted through float level adjuster arm holes 36*a*, 36*b* and a first valve arm hole 28*a* in the first end 24 of the valve arm 20. The float level adjuster 30 is kept from rotating relative to the valve arm 20. In this connection, the first, second or third mounting surface 31*a*, 31*b*, 31*c* may be threadably or otherwise fixedly mounted to the first end 24 of the valve arm 20.

The mounting surfaces 31 are in the form of a series of bores 131 formed in or through the adjuster body 130 of the adjuster 30. The adjuster body 130 comprises a substantially cylindrical shaft 133 having a longitudinal axis E. The shaft 133 is threaded at an engagement end 138 to form the threaded spigot 38 that may be used to connect to the float 32 or to another like piece in the form of a duplicate of the adjuster 30. The first end 24 of the valve arm 20 has a longitudinal axis B. The shaft 133 is substantially hollow and each of the bores 131 are formed in the cylindrical wall 135 of the shaft 133.

The bores 131 each comprise a bore axis $A_{1-2}$, E. The first end 24 of the valve arm 20 is advantageously a snug fit within any one of the bores 131*a-c*. Insertion of the first end 24 of the valve arm 20 into to one of the bores 131 enables the float's 32 female engagement recess or member 39 to extend at either an obtuse, acute, right angle or parallel relative to the main linear section 21 of the valve arm 20. Preferably, the bore axis $A_1$ is aligned at approximately 30-60°, still more preferably at 40-50°, and most preferably at about 45°, relative to a longitudinal axis E of the adjuster 30. The bore axis $A_2$ is preferably aligned substantially normal to the longitudinal axis E.

The float 32 is attached to the float level adjuster 30 with the male float level adjuster threaded spigot 38 by attaching the spigot 38 to the female float thread 39. Prior art floats have been described as being mounted directly to a male valve arm thread on a first remote end of a valve arm. The adjuster 30 according to a preferred aspect of the invention utilises these traditional threaded engagement means to be interposed in fixed engagement between the valve arm 20 and the float 32.

Figure 7A:
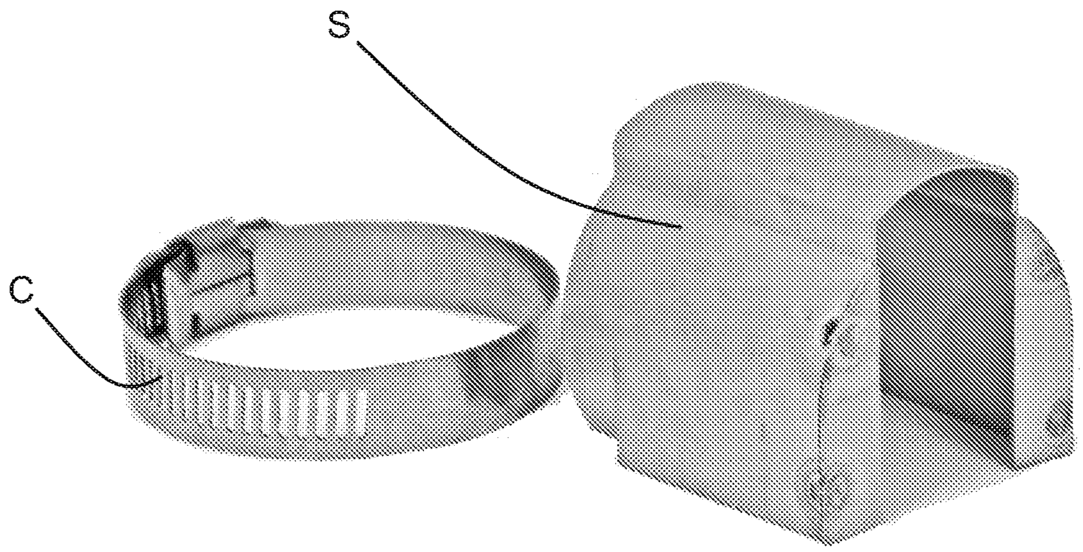
FIG. 7a (Prior Art)
FIGS. 7*a*-7*b* are perspective view of a prior art valve body and its shroud.
Figure 7B:
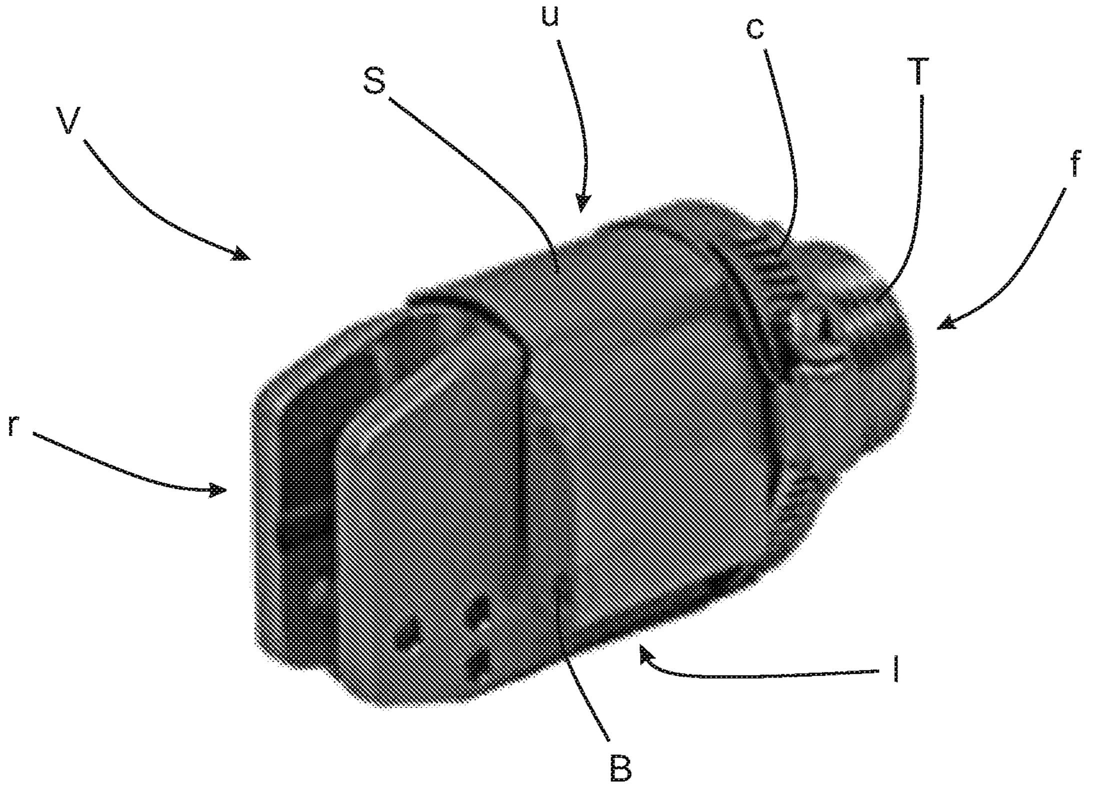
FIG. 7b (Prior Art)

Referring to FIG. 7*b*, a previous version of the Applicant's valve body V included an inlet T at the front f of the valve body V, and left u and a right hand side 1 valve outlets in an intermediate section B of the valve body V. The valve outlets u, 1 are ostensibly side openings formed in the sides of the solid valve body V of the intermediate section B. Consequently, unless the prior valve V is substantially submerged, pressurised fluid will tend to spray to the sides, and also upwardly and downwardly out of the valve outlet into the tank and beyond. Whilst, downward spray may be acceptable (but prone to increasing evaporation), upward spray is problematic, involving wastage and poor control of the water being handled, and not least potentially annoying for users. To correct this, a shroud S is clamped on to an upper portion of the intermediate section B of the prior valve V, to deflect upward flow and spray and to redirect it downwardly. An equivalent, separate shroud is not required in the preferred embodiments of this invention.

The prior valve body V required three apertures a to provide for a hinge pin, and a pair of alternative locations for a stop pin, depending on whether the valve V was to be set in situ for a high pressure or a low pressure application. The present valve body 11 of an embodiment of the invention includes a single pair of opposed apertures through which hinge pin 18 extends and is located. The hinge pin 18 provides the hinge about which the second end 26 of the valve arm 20 rotates. The contact surface 22 of the hinged end 26 transitions through the bend or elbow 23 to the main linear section 21 of the valve arm 20. The contact surface 22 is positioned below the elbow 23 on the second end 26 of the valve arm 20.

Referring to FIGS. 8*a-f*, in the valve body 11 made according to an embodiment of the invention, the valve body 11 is installed in the orientation shown in FIG. 2. The valve body 11 includes a central cylinder 111 that provides an upper cover and inner deflection surface to deflect upward flow and spray and redirect it downwardly through the outlet 13*b*. The valve body 11 therefore has a single, downwardly facing outlet 13*b*. The location of the valve outlet 13*b* on the base of the valve body 11 directs the flow towards the water in the tank 40 in the case where the valve body is above the water level in the tank 40. This keeps the water from spraying outside the tank 40.

Furthermore, the prior art version valve body V included thicker walls surrounding the valve piston channel 16*a*. The walls surrounding the valve piston channel 16*a* on the present valve body 11 are thinner. The thickness of the wall 112 of the central cylinder 111 is in the range of between 3 and 10% of the outer diameter of the cylinder 111. More preferably, the wall 112 has a thickness of between 5-7.5% of the outer diameter of the cylinder 111. The plates 19*a,b* may have a thickness similar to that of the wall 112. The reduced thickness of the walls or plates 112,19*a,b* is counterintuitive as it was thought to diminish the capacity of the valve 1 to accommodate high water flow and high pressures and lead to greater failure rates. However, the reduced wall and plate thicknesses result in reduced costs, while structural integrity of the valve body 11 is enhanced by the addition of the of the central cylinder 111. This surprising saving in materials in the walls and plates 112,19*a,b* can be achieved because the extra material used to form the central cylinder 111 strengthens and gives rigidity to the overall valve body 111.

Figure 8F:
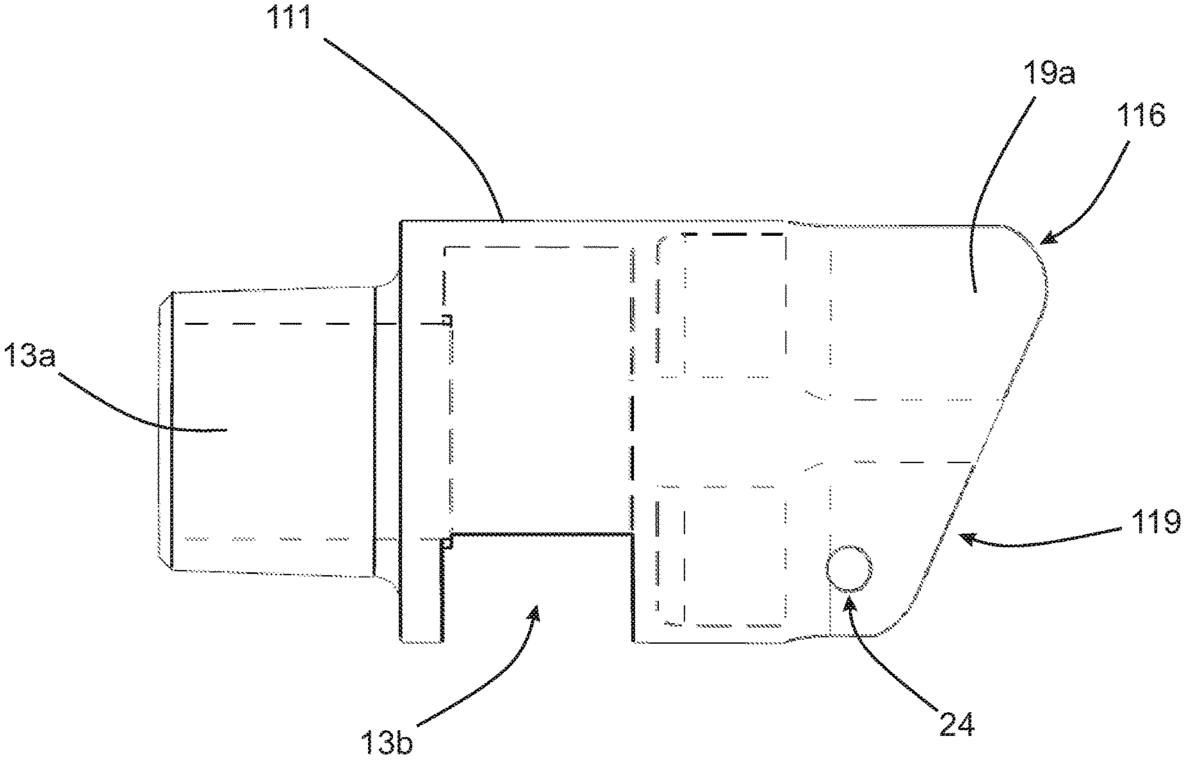

The central cylinder 111 includes an upper semi-cylindrical shroud that covers between about 70-80%, and more particularly 74-76%, of the top portion of the valve body 11 central region defining the outlet 13*b*, as shown best in FIG. 8*f*. The shroud forms a or the wall of the valve channel 15.

In a side view shown in FIG. 8*f*, the plates 19*a,b* are tapered inwardly and downwardly towards the hinge 14 along a rear wall 119 extending from an upper protruding nose 116. The upper surface of the nose 116 is substantially coplanar with the upper surface of the central cylinder 111. The inner surfaces of plates 19*a,b* include a substantially horizontal pair of opposed grooves 115*a* that are axially parallel and extend in a direction substantially parallel to a longitudinal axis of the second piston channel 16*b*. The inner surfaces of plates 19*a,b* further include a substantially vertical pair of opposed grooves 115*b* located frontward, preferably immediately frontward, of the hinge 14. The grooves 115*a,b* act as over centre cam surfaces whereby to register the elbow or bend 23 or an adjacent portion of the valve arm 20 at extreme ends of the rotational range of the valve arm 20.

The inlet 13*a* may be varied in diameter to fit a range of standard coupling sizes. The inlet 13*a* may be varied by manufacturing a range of otherwise identical valve bodies 11, distinguished only by the inlet 13*a* diameter.

Definitions

Throughout the specification and claims the word "comprise" and its derivatives are intended to have an inclusive rather than exclusive meaning unless the contrary is expressly stated or the context requires otherwise. That is, the word "comprise" and its derivatives will be taken to indicate the inclusion of not only the listed components, steps or features that it directly references, but also other components, steps or features not specifically listed, unless the contrary is expressly stated or the context requires otherwise.

In the present specification, object terms such as "apparatus", "means", "device" and "member", or similar terms, may refer to singular or plural items and are terms intended to refer to a set of properties, functions or characteristics performed by one or more items or components having one or more parts. It is envisaged that where the object term is described as being a unitary object, then a functionally equivalent object having multiple components is considered to fall within the scope of the object term, and similarly, where the object term is described as having multiple components, a functionally equivalent but unitary object is also considered to fall within the scope of the object term, unless the contrary is expressly stated or the context requires otherwise. Where the word "for" is used to qualify a use or application of an object term, the word "for" is only limiting in the sense that the device or component should be "suitable for" that use or application.

Orientational terms used in the specification and claims such as vertical, horizontal, top, bottom, upper and lower are to be interpreted as relational and are based on the premise that the component, item, article, apparatus, device or instrument will usually be considered in a particular orientation, typically with the holes 28*b* in a lower position in the valve body 11 and the inlet 13*a* frontward of the valve 1.

The invention claimed is:

1. A valve including a valve device, a valve arm, and a float, the valve device including:

a valve body including:
- a valve inlet and a valve outlet;
- a valve channel and a valve piston channel;
- a valve arm hinge mounting member; and
- a valve body contact surface, a pivoting connection adapted to accommodate a valve arm hinge connecting the valve arm to the valve body and comprising one or more apertures, the valve arm being of a type having a remote first end adapted to attach to the float and a hinged second end having a valve arm contact surface and a terminal portion adapted to extend beyond the valve arm hinge, the terminal portion being at a second end of the valve arm between the valve hinge and a very end of the second end; and a valve piston adapted to move linearly in the valve piston channel, the valve piston including:
- a first valve piston end that directly contacts the valve arm contact surface; and
- a second valve piston end adapted to form a seal over part of the valve piston channel to resist or stop flow of fluid through the valve piston channel, the second valve piston end being adapted, in a closed position, to apply a sealing force against a pressurized fluid contacting the second valve piston end, wherein:
- the valve piston is adapted to move from an open position to the closed position upon force being applied directly to the first valve piston end by the valve arm contact surface with the valve arm moving from a lower valve arm position to a higher valve arm position thereby being adapted to restrict or stop fluid flow through the valve piston channel;
- the valve arm hinge is positioned so that the very end of the second end is adapted to abut the valve body contact surface in the open position to limit the rotational travel of the valve arm about the valve arm hinge, the valve body contact surface being in the form of a face of a wall of the valve body; and
- the valve arm hinge mounting member does not include an additional detent in the form of an aperture or stopper that is offset from and parallel to an axis of the valve arm hinge;
- the valve arm hinge mounting member includes plates that form a pair of spaced and parallel flanges that extend rearwardly of the valve body, the plates forming a channel or corridor within which the hinged end of the valve arm rotates between the open and closed positions;
- the valve arm includes a bend between a main section of the valve arm and the hinged second end, the hinged second end including the valve arm hinge, the valve arm contact surface, and the very end of the second end; and
- as the valve arm contact surface rotates, the valve piston is adapted to:
- correspondingly move in a linear direction in the valve piston channel; and
- ride over and continually bear on the valve arm contact surface.

2. The valve as claimed in claim 1, wherein the valve is adapted to be located in a tank, the valve outlet is part of a base of the valve body and a shroud unitarily formed as part of the valve body covers the entire valve piston channel, except the base, wherein flow is directed toward water in the tank in a case where the valve body is above a water level in the tank.

3. The valve as claimed in claim 1, wherein the valve piston includes a valve piston insert, a valve piston body and a valve piston seal, and the valve piston seal is adapted to seal over a valve channel sealing surface to stop any water passing the valve piston seal and flowing directly into the valve channel when the valve piston is in the closed position.

4. The valve as claimed in claim 3, wherein the valve piston insert is not attached to the valve piston body but only contacts the valve piston body, such that the valve piston seal is attached to the valve piston body with a press fit.

5. The valve as claimed in claim 1, wherein the relationship between a length B of the terminal portion and a spacing A of the valve body contact surface from the valve arm hinge is expressed by the formula $0.5A \le B \le A$.

6. The valve as claimed in claim 1, further including a float level adjuster, wherein the float level adjuster includes one or more mounting surfaces, whereby the mounting surfaces connect the float level adjuster to the valve arm.

7. The valve as claimed in claim 1, wherein, in use, the valve arm is adapted not to fall below a valve arm angle below the horizontal even when the fluid level is low, the terminal portion adapted to contact the valve body contact surface when the valve arm is beyond the valve arm angle $\theta$, which is between 20° and 40°.

8. The valve as claimed in claim 7, wherein the valve arm angle is 30°.

9. The valve as claimed in claim 1, wherein the valve arm has a bend angle including or between 70° and 110°.

10. The valve as claimed in claim 9, wherein the bend angle includes or is between 90°-92°.

11. The valve as claimed in claim 1, wherein the plates are tapered inwardly and downwardly towards the valve arm hinge.

12. The valve as claimed in claim 1, wherein the valve body contact surface is curved.

13. The valve as claimed in claim 1, wherein the valve body contact surface is concave to define a recess and is adapted to receive the valve arm contact surface in the recess.

14. The valve as claimed in claim 1, wherein the valve body contact surface is curved to define a part-cylindrical recess with a longitudinal axis aligned transverse to the axis of the valve arm hinge.

15. The valve as claimed in claim 1, wherein the bend of the valve arm includes an outward curved surface, and at least a portion of the outward curved surface includes the valve arm contact surface.

16. The valve as claimed in claim 1, wherein the valve arm contact surface is adapted to rotate away from the valve inlet as it moves toward the open position.

17. The valve as claimed in claim 1, wherein the valve is adapted for use in high mains pressure applications.

* * * * *